(12) United States Patent
Mayo et al.

(10) Patent No.: US 7,204,054 B2
(45) Date of Patent: Apr. 17, 2007

(54) INSECTICIDAL ACTIVATABLE BAIT STATION

(75) Inventors: Roy G. Mayo, St. Charles, MO (US); Stewart Clark, Brentwood, MO (US); Thomas D. Kraatz, Glendale, MO (US)

(73) Assignee: Senoret Chemical Company, St. Louis, MO (US)

( * ) Notice: Subject to any disclaimer, the term of this patent is extended or adjusted under 35 U.S.C. 154(b) by 0 days.

(21) Appl. No.: 11/345,205

(22) Filed: Feb. 1, 2006

(65) Prior Publication Data

US 2006/0191189 A1    Aug. 31, 2006

Related U.S. Application Data

(60) Provisional application No. 60/650,394, filed on Feb. 4, 2005.

(51) Int. Cl.
*A01M 1/20* (2006.01)
(52) U.S. Cl. .............................. 43/131; 222/85; 239/309
(58) Field of Classification Search .................. 43/131, 43/121; 239/309, 43, 47, 56; 222/81, 82, 222/85
See application file for complete search history.

(56) References Cited

U.S. PATENT DOCUMENTS

| | | | | |
|---|---|---|---|---|
| 2,088,335 A | * | 7/1937 | Michaels ...................... | 43/131 |
| 2,953,868 A | * | 9/1960 | Chambers ..................... | 43/131 |
| 3,538,866 A | | 11/1970 | Gaines | |
| 3,727,840 A | * | 4/1973 | Nigro ........................... | 239/43 |
| 4,161,284 A | * | 7/1979 | Rattan .......................... | 239/43 |
| 4,247,042 A | * | 1/1981 | Schimanski et al. .......... | 239/43 |
| 4,526,320 A | * | 7/1985 | von Philipp et al. .......... | 239/43 |
| 4,563,836 A | * | 1/1986 | Woodruff et al. .............. | 43/131 |
| 4,630,775 A | * | 12/1986 | Mandon et al. ............... | 239/56 |
| 4,696,127 A | * | 9/1987 | Dobbs .......................... | 43/121 |
| 4,793,093 A | * | 12/1988 | Gentile ......................... | 43/131 |
| 4,823,506 A | * | 4/1989 | Demarest et al. ............. | 43/131 |
| 4,837,969 A | * | 6/1989 | Demarest ...................... | 43/131 |
| 4,995,555 A | * | 2/1991 | Woodruff ...................... | 239/43 |
| 5,033,229 A | * | 7/1991 | Demarest et al. ............. | 43/131 |
| 5,490,349 A | * | 2/1996 | Muramatsu ................... | 43/121 |
| 5,501,033 A | * | 3/1996 | Wefler .......................... | 43/131 |
| 5,528,854 A | | 6/1996 | Antonali et al. | |

(Continued)

FOREIGN PATENT DOCUMENTS

EP          395954 A  * 11/1990

(Continued)

*Primary Examiner*—Darren W. Ark
(74) *Attorney, Agent, or Firm*—Paul M Denk

(57) ABSTRACT

An insecticidal activatable bait station including a base, the base having an integral structured reservoir provided therein, a series of piercing spikes extend upwardly from the base of the reservoir, and are provided for piercing the seal of a container holding a supply of liquid insecticide, to allow for the deposition into the base when prepared for usage. A series of columns extend upright form the base, holds the containerized liquid either in an elevated position, as during shipment, storage, display, or while awaiting its usage, but that when the liquid container is lowered, and pierced, the container is held into its lowered position, its seal having been pierced, for deposition of its liquid insecticide into the base reservoir, for consumption by any insects. Convenient ramps are provided to allow access through slots into the reservoir, when attracting any insect located nearby.

9 Claims, 2 Drawing Sheets

U.S. PATENT DOCUMENTS

| | | | |
|---|---|---|---|
| 5,548,922 A * | 8/1996 | Wefler | 43/131 |
| 5,555,741 A * | 9/1996 | Oakley | 239/309 |
| D374,703 S | 10/1996 | Dickson et al. | |
| 5,694,990 A * | 12/1997 | Crima | 222/85 |
| D392,365 S | 3/1998 | Demarest et al. | |
| 5,737,870 A * | 4/1998 | Thind | 43/121 |
| 5,839,221 A * | 11/1998 | Ron et al. | 43/131 |
| 5,873,193 A | 2/1999 | Jensen | |
| 5,875,586 A * | 3/1999 | Ballard et al. | 43/131 |
| 5,943,816 A * | 8/1999 | Hyatt et al. | 43/131 |
| 5,983,558 A * | 11/1999 | Las et al. | 43/131 |
| 6,041,542 A * | 3/2000 | Payton et al. | 43/131 |
| D425,961 S | 5/2000 | Kemmis | |
| 6,145,242 A * | 11/2000 | Simpson | 43/131 |
| 6,192,621 B1 * | 2/2001 | Fain | 43/131 |
| 6,202,341 B1 | 3/2001 | Bernard | |
| 6,343,434 B1 * | 2/2002 | Petti | 43/131 |
| D456,058 S | 4/2002 | Rollins | |
| 6,370,813 B1 * | 4/2002 | Nelson et al. | 43/131 |
| 6,553,712 B1 * | 4/2003 | Majerowski et al. | 43/131 |
| 6,651,378 B2 * | 11/2003 | Baker | 43/131 |
| 6,655,079 B1 * | 12/2003 | Bernard et al. | 43/131 |
| D495,773 S | 9/2004 | Duston et al. | |
| 6,796,082 B1 * | 9/2004 | Duston et al. | 43/131 |
| D515,175 S | 2/2006 | Mayo et al. | |
| 7,051,474 B1 * | 5/2006 | Tesh | 43/131 |
| 2006/0080889 A1 * | 4/2006 | Kupfer et al. | 43/131 |

FOREIGN PATENT DOCUMENTS

| | | | |
|---|---|---|---|
| EP | 793913 A1 * | 9/1997 | |
| JP | 11-346626 A * | 12/1999 | |
| JP | 2000-325004 A * | 11/2000 | |
| JP | 2001-299893 A * | 10/2001 | |
| JP | 2002-281881 A * | 10/2002 | |
| JP | 2002-320437 A * | 11/2002 | |

* cited by examiner

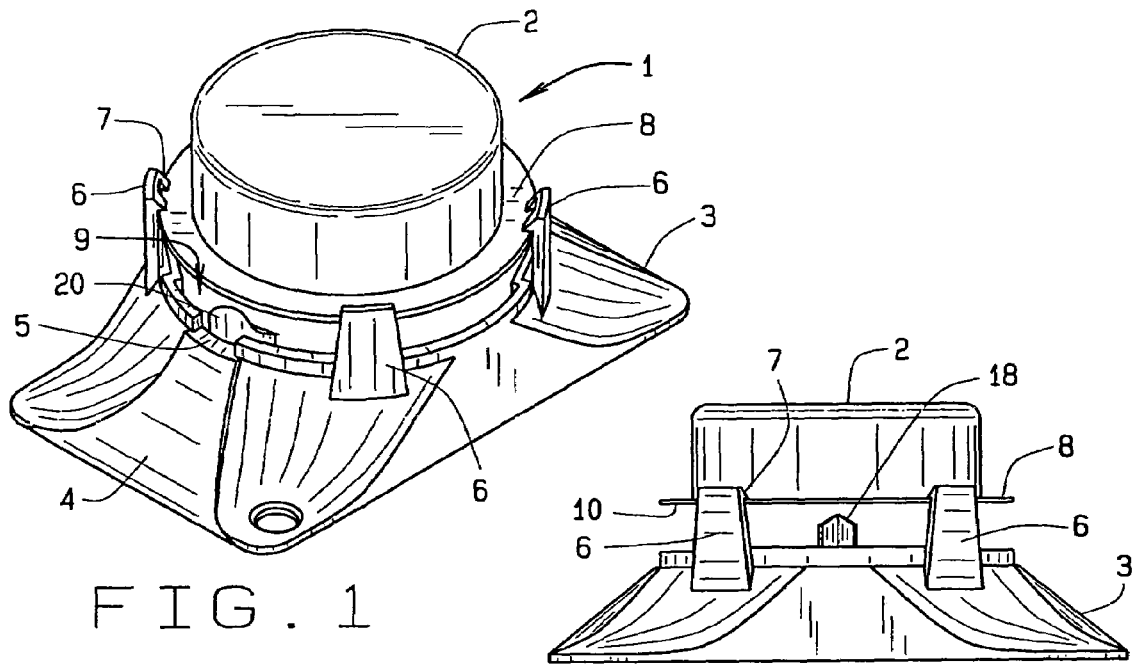
FIG. 1
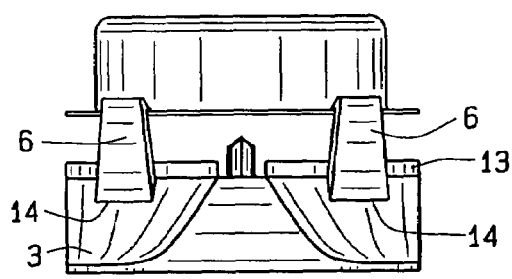
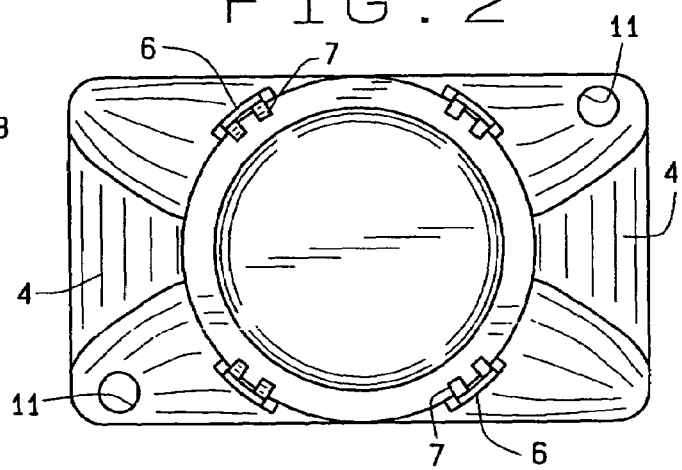
FIG. 2
FIG. 3
FIG. 4
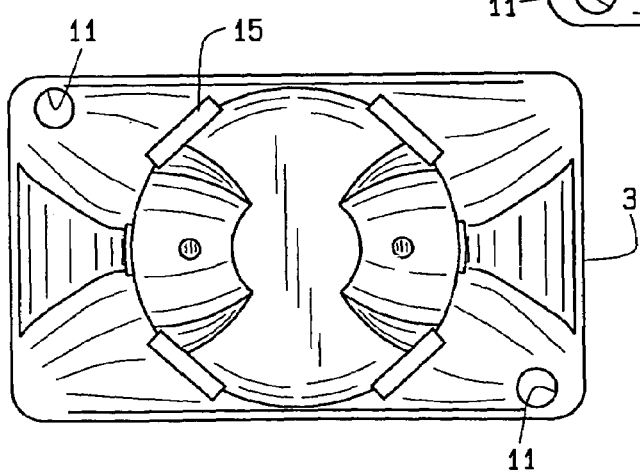
FIG. 5

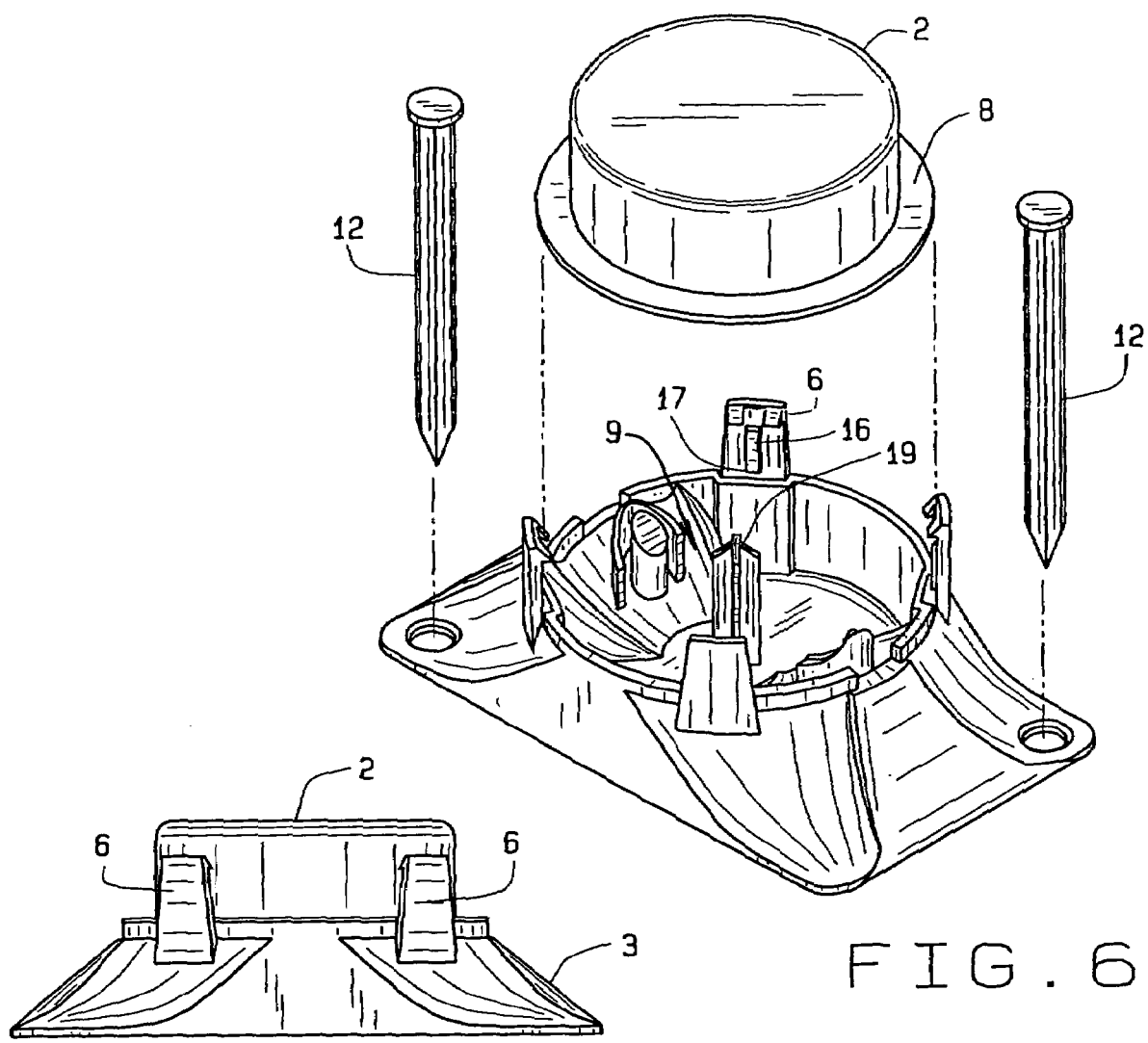
FIG. 6
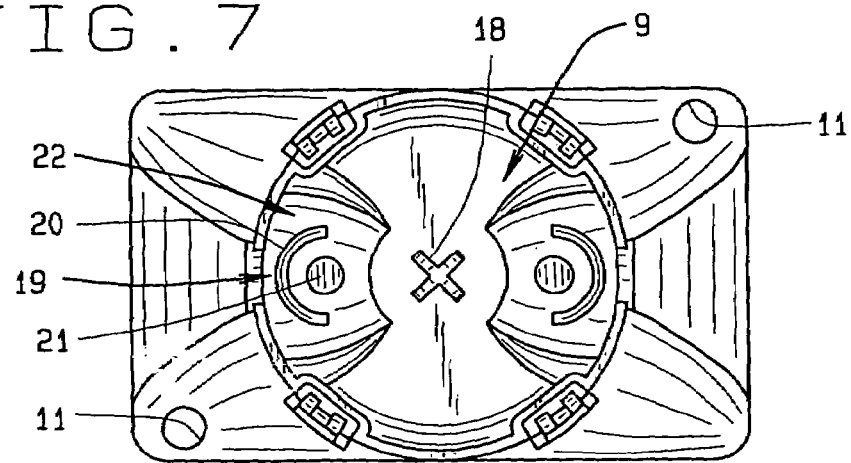
FIG. 7
FIG. 8

INSECTICIDAL ACTIVATABLE BAIT STATION

CROSS REFERENCE TO RELATED APPLICATION

This nonprovisional patent application claims priority to the provisional patent application having Ser. No. 60/650,394, filed on Feb. 4, 2005, which claims priority to the design application having Ser. No. 29/215,860, which was filed on Oct. 26, 2004.

BACKGROUND OF THE INVENTION

This invention relates to a device for containing an insecticide for eradicating insects and pests, and more specifically, relates to an integrated insect bait station that can be stored or shipped in a pre-use condition, and then physically activated, when it is desired to set it out for attraction and elimination of insects, and other pests.

Insecticides for use for killing of insects have been around for many, many years. Containers for holding such insecticides have likewise been available for both professional and retail customer applications.

Examples of the type of prior art that are available, can be seen in various United States patents that have issued relating to this type of technology. For example, the patent to Gaines, U.S. Pat. No. 3,538,866, shows what is identified as a dispenser for fumigants and method of applying same. The shown device is for use for delivering fumigants, which includes an evaporating tray, with upstanding guide members, spaced around the walls thereof, and a perforating pin located centrally therein, for perforating the fumigant canister when a downward force is exerted upon the cover as disposed over the shown canister. Thus, it provides a method for transfer, storage, and also prevents manual contact with any release of fumigants, during usage.

The patent to Nigro, U.S. Pat. No. 3,727,840, shows a dispersant container and dispenser. This is a container comprising a molded plastic member, having a cup shaped chamber in its bottom, and also includes a wick means in its structure. Apparently a wall of its upper container is pierced by the conical portion, for the flowing of its contained liquid downwardly, into the wicking member, for dispersement of its gaseous and vaporous materials.

The patent to Schimanski, et al, U.S. Pat. No. 4,247,042, shows a vaporizer for insecticides and/or volatile active substances. This device also includes a casing, for holding the insecticide that is apparently pierced by an opener. The insecticide apparently flows under the holder, as can be noted. The casing has a series of openings, which apparently are the locations where the insects move, during usage of the shown device.

The patent to von Philipp, et al, U.S. Pat. No. 4,526,320, shows an apparatus for vaporizing insecticides, perfumes and/or other volatile agents. This particular device also includes a series of components that provide for, for example, a cartridge whose bottom membrane is pierced by an opener, to deposit its insecticidal substance downwardly. Apparently the insecticide is wicked into the absorbent element, at the bottom of the device. There are ports, along the sides, that allow the insecticide to apparently vaporize, more than likely for the purpose for having it released through the ports, rather than have the insects pass there into, for consumption of any bait.

The patent to Mandon, et al, U.S. Pat. No. 4,630,775, is upon a dispenser for releasing a volatile active substance. This device is apparently for dispensing a gaseous substance, and is not really a true insect bait station per se.

The patent to Ron, et al, U.S. Pat. No. 5,839,221, is upon an insecticidal device. This particular device defines a spherical body holding a liquid. There is also an adhesive coating on its panel, in order to hold the insects once they enter the shown device.

The patent to Las, et al, U.S. Pat. No. 5,982,558, shows an insect bait station with a method of treating insects with toxicant. This device is an insect bait station, that defines how the passage way dimensions, and the applicator being disposed in the passage ways, are such that an insect will contact the toxicant applicator so that a quantity of toxicant is applied the insect as is it traverses the ramp to the well.

The patent to Majerowski, et al, U.S. Pat. No. 6,553,712, is upon another insecticidal liquid bait station. This particular device does include an insecticidal bait station, it has a reservoir, but it also incorporates a liquid wicking device, which is of a different structure from the current invention.

These are examples of prior art type of bait stations that are known to the Applicant, as available in the art.

SUMMARY OF THE INVENTION

This invention contemplates the production of a bait station which is integrated from the standpoint that it includes both a sealed supply of bait, and a base embodying a reservoir, the containerized bait being shiftably affixed to the base by means of an upright supports, so that the bait station can be stored, shipped, marketed, and displayed, ready for usage, and all integrated into a singular structure, once it is purchased and activated, the user simply needs to depress the containerized bait to allow for its flow into the reservoir, ready for attraction and consumption by ants, and a myriad of other insects. Thus, the primary concept of the invention is to provide availability of a liquefied bait, that is suspended upwardly from its base, and all its application and usage requires is its forcing downwardly, puncturing its seal, to allow for the deposit of its liquid bait within the reservoir of the base for immediate application. Thus, there is no need to buy an extra supply of liquid insecticide; it is integrated into the structure of this bait station, ready for application and usage.

In addition, the base is formed to include various features and characteristics that make it convenient for the insect to simply crawl up certain segments of its walls, to enter through formed apertures that allow for immediate access into the interior of the station, so as to walk into the vicinity of the deposited liquefied insecticide, for consumption, and either for immediate death, or for carrying such bait back to the colony, to thereby infect others of the insect family.

The bait station further includes integral components that allow for the uniform puncturing of the sealed covering for the bait reservoir, so that the liquid will deposit directly downwardly, and not migrate laterally, or remain within the reservoir, which would be ineffective as an insect attractant, unless the liquid bait is readily disposed, and provides for this rapid dissemination of its flavoring scent, to attract the insects, and to achieve its intended results.

Another feature of this invention is that the bait has significant length and width, relative to the operative features of this station, so that it is very stable when rested upon the ground, and cannot be turned over or shifted, especially by the insects, even if encountered by something that provides it with greater impact. In addition, the station is designed to accommodate pegs, to effectively nail the bait station and its base to the ground, to assure that even if, for example, a human should inadvertently brush the bait station with a foot, the station will remain intact, upright, and readily available for its operational function.

In addition, in order to sustain the retention of this bait station on the ground, once installed, one or more stakes may be provided and can be impaled through the base of the bait station, into the ground, so as to prevent its unauthorized removal. Furthermore, these stakes, during shipment and storage, or display for sale, of the bait station, are arranged between the station base, and the insecticide holding container, so as to further prevent the unauthorized piercing of the container, which would inadvertently and prematurely release its insecticide, because the spacing between these two components is maintained by the stakes which are arranged intermediate these components, and to prevent their relative shifting toward each other, until usage.

In addition, a liquid container of this bait station, once it has been depressed, pierced, and its insecticide deposited into its base, further functions as a weather proofing lid, since it extends substantially over the bait reservoir, to prevent the entrance of any diluting substance, such as water, snow, or other debris, which may otherwise diminish the effectiveness of the reservoired insecticide, during usage.

Hence, it is the principal object of this invention to provide a bait station that is of unified design, incorporating all of the operational features within its singular structure.

Another object is to provide a bait station where all of its usable characteristics are integrated into a singular structure, ready for actuation by the user, to activate the bait station as an insect attractant.

Still another object of this invention is to provide a bait station wherein its insecticide, once it has been deposited within it base reservoir, is ready to attract insects or consumption of the insecticide, to their determent.

Still another object of this invention is to provide a bait station where its containerized insecticide can easily be activated by simply depressing its container downwardly onto piercing means that readily deposits all of the liquid insecticide into the subjacent reservoir of the bait station.

These and other objects become more apparent upon review of this particular invention, as depicted in its preferred embodiment, as illustrated in the drawings.

BRIEF DESCRIPTION OF THE DRAWINGS

In referring to the drawings,

FIG. 1 is a perspective view of the insecticidal activatable bait station of this invention;

FIG. 2 is a front elevation thereof;

FIG. 3 is a side elevation;

FIG. 4 is a top plan view;

FIG. 5 is a bottom view thereof;

FIG. 6 is a perspective and exploded view of the bait station, with its top cover removed;

FIG. 7 is a front elevation of the bait station with the cover depressed during activation; and FIG. 8 is a top plan view with the bait holding cover removed.

DESCRIPTION OF THE PREFERRED EMBODIMENT

In referring to the drawings, and in particular FIG. 1, therein is shown the insecticidal activatable bait station 1 of this invention. It includes a container 2, its upper segment, and the container being designed for holding, in a sealed capacity, until usage, a supply of the insecticide, until activation of the bait station. The bait station further includes a base 3, which has substantial length and width, in order to provide stable support when it rests upon the ground, or another surface, during application and usage. The Bait station includes upward ramps, as at 4, on either side, so that insects can crawl up the base, enter through the opening slots 5, that are sufficient size to allow the insects to crawl therethrough, to obtain access to the deposited insecticide.

As can also be seen in FIGS. 1 and 2, the base incorporates upright columns, as at 6, which at their upper end include integral barbed like structures, as at 7, and a design for accommodating the flange element 8 of the container 2, and to prevent its further upward movement, beyond the barbs 7, after assembly. There are four such columns arranged around the perimeter of the container 2, upwardly near the entrance into the reservoir 9, located inwardly and centrally of the formed base 3.

The reservoir 2, with its integral flange 8, is designed for holding a supply of the insecticide, intact, until such time as it is released and deposited into the reservoir 9. A poly/foil laminate seal, as at 10, is applied to the bottom of the flange 8, to seal the insecticide therein, until such time as it is punctured. Through the usage of this type of seal, the insecticide can maintain its freshness, be undiluted from any external source, and until the seal is punctured, by one of the base spikes, it remains totally undiluted.

The barbs 7 that extend upwardly from the base 3 are generally diametrically arranged around the perimeter of the reservoir 2, as can be more clearly seen in FIG. 4.

The base also includes one or more apertures, as at 11, at one or more corners, and which can accommodate a stake 12 therethrough, as can be noted in FIG. 6, in order to secure the bait station to the ground, during application and usage.

In order to provide for more flexibility or resiliency to the columns 6, which column is secured a distance downwardly from the upper edge, as at 13, to the base 3, generally as can be seen at 14, and integrally connected with the base or molded therewith thereat, and has a slight spacing, as at 15, between the base, and the upper edge 13 of the reservoir entrance, which clearance allows for greater resiliency due to additional length to each column, in its structure. Hence, in order to insert the container 2, and its integral flange, within the columns, the columns can be flexed outwardly, the container located therein, when assembled.

As can also be seen in FIG. 6, the interior of the surface of each column 6 has a slide 16, so that when the reservoir 2 is slid downwardly, as when one wants to activate the insecticide contained therein, its flange 8 rides upon the slide 16, and once it clears its bottom edge, as at 17, the flange is locked in place, within each column 6, at the bottom 17 of each slide 16, so as to assure that once the reservoir is punctured, it remains in place, and its fluid is deposited downwardly, into the reservoir 9, as can be seen.

As can also be noted upon the interior of the bait station, and arranged upstanding within its reservoir 9, is a central spike 18, which is shaped in cross section in a configuration of a cross, and the upper end, as at 19, is designed for piercing the central portion of the film 10, as the container 2 is forced downwardly, in the manner as previously described. In addition, there is a pair of piercing elements, as at 19, including an arcuate segment 20 and canted spike 21, on each end of the reservoir, and these aid in providing for further piercing of the film, to assure that all of the insecticide contained therein will be able to flow downwardly, into the reservoir 9, in order to charge the bait station, for initiating the termination of the proximate ants or other insects. Obviously, these types of spikes 18, and the piercing members 19, could be provided at other locations within the reservoir, to assure that the container seal 10 is properly pierced, to allow all of the liquid bait to flow downwardly, into the reservoir. Obviously, anyone of these piercing members or spikes can be located at any location around the perimeter of the reservoir, either longitudinally aligned, as shown in FIG. 8, or laterally, or at angular positions, within the base, and function to pierce the sealing poly-foil laminate seal, when the container is depressed against the base.

A further purpose of the holding container or retention cup 2, when sealed, for containing a supply of the insecticide, allows for its preservation and maintenance of freshness, in addition to toxicity, of the liquid bait, until just prior to its installation and usage, and depression of its container, for breaking of its seal and depositing its insecticide into the base reservoir 9.

It can also be seen that integrated into the structure of the reservoir, and providing further support for the piercing members 19, is an inclined integral ramp 22, at each side end of the reservoir, in order to allow the insects to not only move up the surfaces 4, but to freely move down the ramps 22, to obtain access to the liquid insecticide within the bait station, during usage.

Thus, from the description of this invention, it can be readily seen that the bait station is thoroughly integrated into a unified structure, it carries its own supply of insecticide, it can be deposited upon manipulation directly into its reservoir, and there are convenient ramps and access slots, as at 5, into the reservoir, to make it convenient for the insect to attain access into the bait station and to the insecticide, for consumption, or for carrying back to the colony. It provides convenient access to the liquefied insecticide, for the insects, to assure that they attain full access to the bait, once the bait station has been activated.

It is also just as likely that during storage, shipment, or display, as when the bait station is packaged for sale, the stakes 12 may be arranged within the gap between the liquid holding container 2, and the upper edge 13 of the base, the retention therein, to prevent any premature forceful shift of the container downwardly upon the base for authorized usage. In this manner, the entire bait station, with its stakes, can be packaged for shipment and display, and not be activated inadvertently, or by vandals, before its intended usage.

Variations or modifications to the subject matter of this invention may occur to those skilled in the art upon review of the summary of the invention as provided herein, and upon undertaking a study of the description of its preferred embodiment. Such variations, if within the spirit of this development, are intended to be encompassed within the scope of the invention, as described. The particular structural relationship of the various components that make up this bait station, as shown in the drawings, are set forth for illustrative purposes only.

The invention claimed is:

1. An activatable bait station for holding a supply of liquid insecticide, said station including a base, said base having a reservoir formed therein, a series of access surfaces in the form of exposed, inclined ramps extending from a lower portion of the base up to an upper portion of the base for accommodating access of insects into the base and to its reservoir, and to attain access to any liquid insecticide deposited therein, a container including a seal for holding sealed liquid insecticide therein arranged upwardly from the base, said container normally holding a supply of sealed liquid insecticide therein before usage, the container being connected with the base, holding structure including a series of upwardly extending supports extending upwardly from the base, for accommodating the container, a spike extending upwardly from a central portion of the reservoir toward the container, the spike for piercing a portion of the seal, at least one piercing member extending upwardly from the reservoir and being laterally offset from the central portion of the reservoir and the spike, the at least one piercing member for piercing another portion of the seal, the at least one piercing member comprising a canted spike and an arcuate segment, the canted spike having a first end at a surface of the reservoir and a second end both spaced from the surface of the reservoir and having a planar surface which is at an oblique angle relative to a longitudinal axis of the canted spike which is defined between the first and second ends thereof, the arcuate segment having a first end at the surface of the reservoir and a second end spaced from the surface of the reservoir, the arcuate segment being laterally spaced from and partially surrounding the canted spike, the arcuate segment defining a longitudinal axis between said first and second ends thereof which is parallel to the longitudinal axis of the canted spike, wherein when the container is elevated, the container retains the insecticide within the container, but that when the container is forced downwardly toward the base to a lowered position and the seal is pierced by the spike and the at least one piercing member, discharges the liquid insecticide into the base reservoir, for consumption by any proximate insects.

2. The bait station of claim 1 wherein the upwardly extending supports comprise columns, said columns having upper ends and including engagement means to assure retention of the container above the base during storage, and to assure retention of the container to the base and to prevent its unauthorized removal until after usage.

3. The bait station of claim 2 and including locking means provided at a lower segment of said columns, thereby retaining the container at its lowered position, when piercing its seal to provide for deposition of a liquid insecticide into the base reservoir as during usage.

4. The bait station of claim 3 wherein there are a pair of piercing members extending upwardly from the base, within its reservoir, and said piercing members being diametrically arranged and spaced from the center of the base reservoir.

5. An insecticidal activatable bait station, including a base, said base incorporating a reservoir for holding a supply of liquid insecticide during usage, said base having a series of access surfaces in the form of exposed inclined ramps that lead from a bottom of the base to the approximate top of the base for accommodating access of insects into the base and to any insecticide therein, a container including a seal for holding sealed liquid insecticide therein arranged upwardly from the base, said container normally holding a supply of sealed liquid insecticide therein before usage, the container being connected with the base, a spike extending upwardly from a central portion of the reservoir toward the container, the spike for piercing a portion of the seal, at least one piercing member extending upwardly from the reservoir and being laterally offset from the central portion of the reservoir and the spike, the at least one piercing member for piercing another portion of the seal, the at least one piercing member comprising a canted spike and an arcuate segment, the canted spike having a first end at a surface of the reservoir and a second end both spaced from the surface of the reservoir and having a planar surface which is at an oblique angle relative to a longitudinal axis of the canted spike which is defined between the first and second ends thereof, the arcuate segment having a first end at the surface of the reservoir and a second end spaced from the surface of the reservoir, the arcuate segment being laterally spaced from and partially surrounding the canted spike, the arcuate segment defining a longitudinal axis between said first and second ends thereof which is parallel to the longitudinal axis of the canted spike, whereby upon shifting of the container towards the base to a lowered position and the seal is pierced by the spike and the at least one piercing member, liquid insecticide is deposited into the base reservoir to attract and terminate any insect that passes up the ramps and into the reservoir, means for connecting the container to the base including upright columns, said columns embracing the container, initially spaced upwardly from the base as during storage, but said container capable of shifting downwardly within its columns, and towards the base to the lowered position to effect its piercing, opening and deposition of the contained insecticide into the base reservoir as an insect attractant and terminator, and said base including at least one stake operatively associated therewith to secure said base and the activatable bait station to the ground upon which the bait station is located.

6. The bait station of claim 5 wherein there are a pair of stakes for holding the base to the ground.

7. The bait station of claim 6 wherein during storage of said bait station, said stakes are arranged intermediate the container and the base for retention until removed for usage.

8. The bait station of claim 6 wherein said pair of stakes, before usage, are maintained between the base and container to maintain their separation until the stakes are removed prior to usage.

9. The insecticidal activatable bait station of claim 5 wherein the container holding the insecticide is arranged above the base reservoir, to shelter any insecticide located within the reservoir and to maintain the weather resistant attributes of the bait station during usage.

* * * * *